Sept. 11, 1928.  
G. A. SMITH  
1,683,735  
HYDROMETER CHAMBER  
Filed July 2, 1923
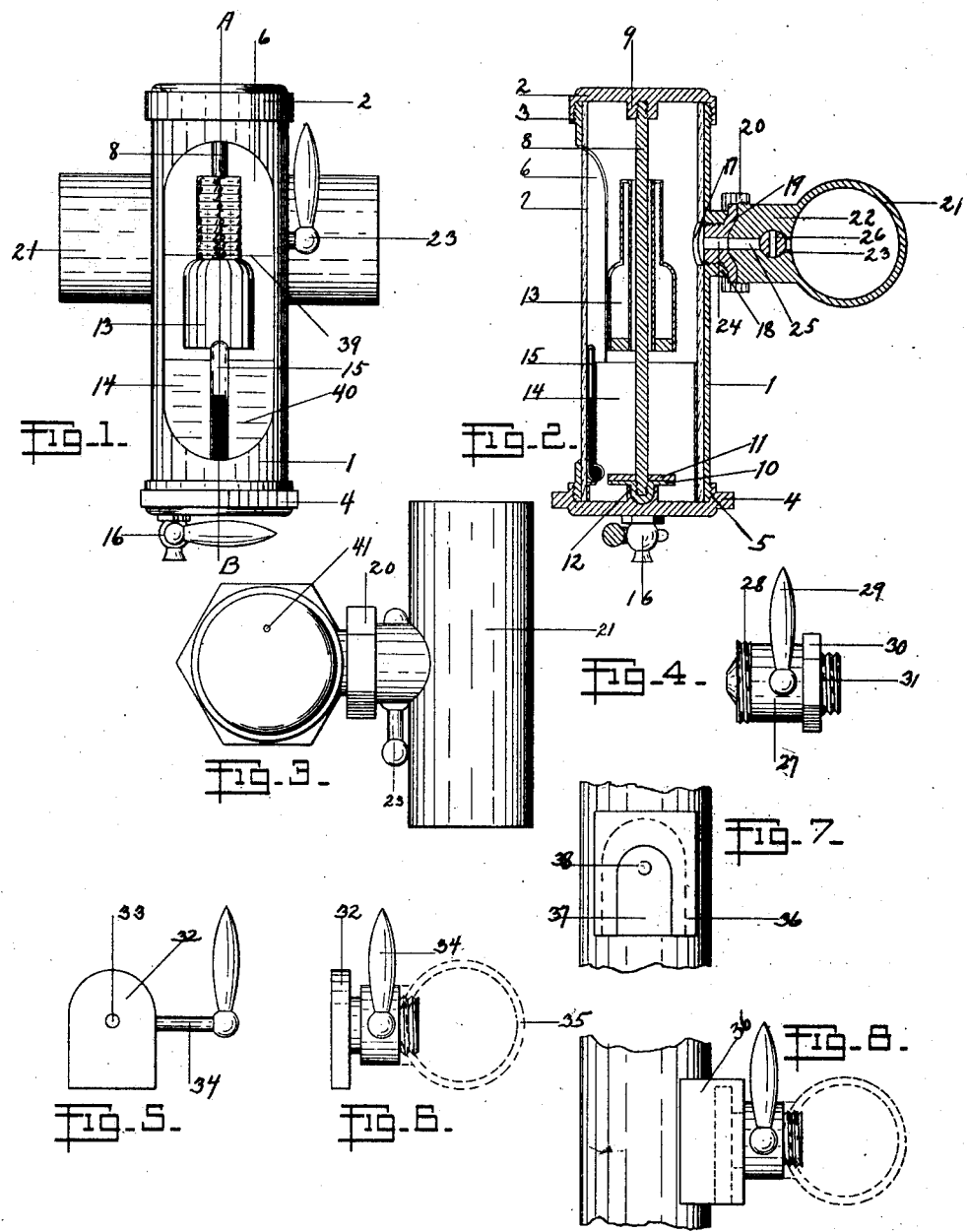

Patented Sept. 11, 1928.

1,683,735

UNITED STATES PATENT OFFICE.

GEORGE A. SMITH, OF BALTIMORE, MARYLAND.

HYDROMETER CHAMBER.

Application filed July 2, 1923. Serial No. 649,090.

This invention relates to a hydrometer chamber and more particularly to a testing implement embodying a hydrometer chamber readily attached and detached to a fluid container and which is provided with means for admitting a portion of the fluid contents of said container into said hydrometer chamber at the time when it is desired to test the density of the same for the purpose of determining its freezing point. A special adaptation of the invention is its use in connection with the cooling system of a gas engine, to which it may be permanently or temporarily attached for the purpose of testing the quality of the cooling medium in said engine.

The device of this application is an improvement upon the invention described and claimed in my copending application serially numbered 631,558 filed April 12, 1923.

The object of the invention is the equipment of a gas engine with a hydrometer chamber, whereby the density of the cooling fluid of the engine may be read at will. Another object is the provision of means whereby the fluid in the cooling system of the engine may be admitted to the hydometer chamber at will for testing purposes, and means for withdrawing the fluid from the hydrometer chamber after the testing. Another object is the association in a single chamber of a hydrometer and a thermometer, whereby the density reading and temperature correction of a fluid may be readily determined in ascertaining an actual freezing temperature.

Other objects and advantages of the invention will hereinafter appear in the following description and the novel features thereof will be particularly pointed out in the appended claims.

Like reference numerals indicate like parts throughout the several figures of the drawings, in which Figure 1 is an elevation of my invention, Figure 2 is a sectional view taken upon the line A—B of Figure 1,

Figure 3 is a plan,

Figure 4 is an elevation of a modified form of connecting or coupling element of my invention, Figures 5 and 6 are views of one element of a modified form of coupling or connector, Figure 7 is a view of the companion element of said modified coupling, and Figure 8 is a side elevation of said modified coupling when in use.

Referring to the drawings in detail, the numeral 1 designates a metallic cylinder forming the body of my hydrometer chamber. The cover 2 is provided with a flange having screw threads 3 by means of which the cover is secured in a liquid tight manner to the upper screw threaded end of the cylinder 1. A bottom 4 is provided for the cylinder 1 and this is secured in place by means of a screw threaded flange 5 in fluid tight relationship. The cylinder 1 is cut away at one side to provide a window 6 and within the cylinder there is mounted in a fluid tight manner the tube of glass 7 which forms the inner walls of the chamber 1.

A central rod or hydrometer guide 8 extends from the cover 2, where it is screw threaded into the lug 9, to the bottom 4, where it is provided with a base 10 forming a support for the washer of rubber 11 or other suitable material, upon which the hydrometer 13 rests in inactive position. The base 10 is provided with a semi-spherical lower portion, which fits within a correspondingly shaped socket 12 made as a part of the bottom 4. By this construction it is obvious that the hydrometer may be removed from the casing or chamber upon the removal of the cover 2.

In the lower portion of the casing 1 and within the glass tube 7 there is a short metallic tube 14 which is designed to support in proper position a thermometer 15. A portion of this tube is inwardly bent for this purpose and a ledge provided for the vertical support of the thermometer, the bulb resting in a recess provided by cutting away a portion of the tube. By the means just described the thermometer is held against movement within the casing 1.

At the bottom of the casing there is provided a pet cock 16 for drawing the liquid from the casing after a test has been made. The numeral 17 indicates an opening in the glass tube coinciding with an opening in an interiorly threaded projection 18 from the metal casing 1. Within this projection 18 there is mounted a flanged connector 19, the flange thereof extending beyond the contour of the projection and holding in place a nut 20. The numeral 21 indicates any pipe in which liquid may be flowing, the testing of which may be desired. In my copending application hereinbefore referred to, this pipe is a coupling between sections of the rubber hose connection between the engine and the radiator of an automobile. The pipe section 21 is provided with an extension 22, in which is mounted a valve 23, and the passageway through this valve registers with a similar passageway in the extension 22. The extension 22 is provided with screw threads with which the nut 20 engages. It will be appreciated that by this construction the casing for the hydrometer may be clamped to the extension 22 at any desired angle and that it may be readily adjusted by loosening the nut 20. It will be obvious further that when the valve 23 is closed, no fluid will flow into the chamber 1. Upon opening the valve 23, however, liquid will flow through the passageways 26 in the valve, 25 in the extension and 24 in the connector, into the casing 1 for the purpose of testing the density thereof.

In Figure 4 I have shown a slightly different form of nipple for mounting the casing in place upon a liquid container. This comprises a screw threaded portion 28, upon which a nut similar to that shown in Figures 1, 2 and 3 may be threaded, and a screw threaded portion 31 by means of which the nipple 27 may be secured into a threaded opening in any fluid container, such as an engine wall. The numeral 30 represents a hexagonal portion to apply a wrench in securing the nipple in place, while 29 represents the handle of the valve mounted in the nipple.

Still another form of separable connector between the casing 1 and a fluid container or conduit is shown in Figures 5 to 8, in which there is provided a plate 32 having its upper portion curved. This plate is substituted for the threaded end 28 of the nipple 27. The opposite end of the nipple of this form is provided with a screw threaded extension to be screwed into a conduit (shown in dotted lines) or other suitable portion of a fluid container. The casing of the hydrometer chamber is provided with a member 36 flanged to form a socket 37 into which the plate 32 is adapted to be inserted. When thus connected the passageways 33 in the plate 32, and 38 in the member 36, are aligned and upon the manipulation of the valve 34, fluid will be permitted to flow from the container into the hydrometer chamber. This form of the invention is particularly adapted for use where it is desirable not to carry the hydrometer upon the engine at all times, but only temporarily when the testing of the fluid is proceeding.

From the foregoing description, the structural details of my invention will be understood. It is only necessary to describe its use in connection with the testing of the quality of the cooling fluid in a gas engine. Fluid is admitted to the casing and the line 39 indicates a desirable level therefor. The hydrometer will rise from its seat and come to rest with its upper end projecting partially above the fluid level. A reading may then be taken by noting where the fluid level appears upon the scale carried by the hydrometer. The air in the chamber will escape through the vent 41. The reading need not be in terms of actual density but in terms of the freezing temperature of the fluid. In view of the variations in temperature of the liquid at the time of making the reading, a correction must be made for the same. A reading is then taken upon the thermometer 15. This reading will preferably be in terms of the actual correction for the indicated temperature, and the numeral 40 indicates the scale of corrections. By adding or subtracting the correction from the reading of the hydrometer scale, the freezing temperature of the fluid is ascertained, from which it may be determined whether the fluid contents should be changed to prevent freezing.

Having described my invention, what I claim as new and desire to secure by Letters Patent is:

1. In a testing implement, the combination of a chamber comprising a removable cover and bottom, a hydrometer movable within the chamber, means for guiding the hydrometer in the chamber comprising a centrally disposed guide rod detachably secured to said cover, a shelf or support at the lower end of said guide rod, and means on the removable bottom for holding the guide rod at its lower end.

2. In a testing implement, the combination with a casing, a hydrometer in said casing, a thermometer within the casing, a support for said thermometer comprising a tubular element having at its lower portion an opening and a ledge for the thermometer bulb and in its side a groove for the stem thereof.

3. In a testing implement, the combination of a chamber having a cylindrical body, a centrally disposed guide rod in said chamber, a hydrometer mounted to move upon said rod, a thermometer within said chamber comprising a stem and a bulb, and a support for said thermometer comprising a tubular member fitting the inner wall of the cylindrical body and provided with a groove for the reception of the stem of the thermometer and an aperture and shelf at the lower end of said groove for the reception of said bulb.

In testimony whereof I affix my signature.

GEORGE A. SMITH.